United States Patent
Blasco Serrano et al.

(10) Patent No.: US 10,117,240 B2
(45) Date of Patent: Oct. 30, 2018

(54) TRANSMISSION OF PRIORITIZED MESSAGES

(71) Applicant: TELEFONAKTIEBOLAGET L M ERICSSON (PUBL), Stockholm (SE)

(72) Inventors: Ricardo Blasco Serrano, Stockholm (SE); Stefano Sorrentino, Solna (SE); Hieu Do, Solna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 78 days.

(21) Appl. No.: 14/729,230

(22) Filed: Jun. 3, 2015

(65) Prior Publication Data

US 2016/0360524 A1 Dec. 8, 2016

(51) Int. Cl.
*H04W 72/04* (2009.01)
*H04W 76/14* (2018.01)
*H04L 27/26* (2006.01)
*H04L 29/08* (2006.01)

(52) U.S. Cl.
CPC ..... *H04W 72/0446* (2013.01); *H04L 27/2601* (2013.01); *H04L 67/12* (2013.01); *H04W 72/048* (2013.01); *H04W 76/14* (2018.02)

(58) Field of Classification Search
None
See application file for complete search history.

(56) References Cited

U.S. PATENT DOCUMENTS

| | | | | |
|---|---|---|---|---|
| 2010/0238845 A1* | 9/2010 | Love | H04B 7/15528 | 370/280 |
| 2012/0030358 A1* | 2/2012 | MacKenzie | H04W 52/0216 | 709/226 |
| 2012/0077510 A1* | 3/2012 | Chen | H04W 28/26 | 455/452.1 |
| 2012/0127874 A1* | 5/2012 | Oh | H04W 74/0833 | 370/252 |
| 2013/0155962 A1* | 6/2013 | Hakola | H04W 72/042 | 370/329 |
| 2013/0201954 A1* | 8/2013 | Gao | H04W 72/0413 | 370/329 |
| 2013/0279491 A1* | 10/2013 | Rubin | G08G 1/166 | 370/347 |
| 2014/0071921 A1* | 3/2014 | Wang | H04L 5/0062 | 370/329 |
| 2014/0126432 A1* | 5/2014 | Wang | H04B 7/2656 | 370/280 |

(Continued)

FOREIGN PATENT DOCUMENTS

WO 2014/023847 A1 2/2014

OTHER PUBLICATIONS

Lei Lei, et al., "Operator controlled device-to-device communications in LTE-advanced networks;" IEEE Wireless Communications; Piscataway, NJ, US; Jun. 1, 2012.

(Continued)

*Primary Examiner* — Donald L Mills

(57) ABSTRACT

A communications network comprises a plurality of communication devices using shared communication resources. One of the devices identifies a time interval among the shared communication resources that can be allocated for separate use by another one of the devices, identifies a guard period of the time interval, and transmits information within the guard period.

40 Claims, 12 Drawing Sheets

(56) References Cited

U.S. PATENT DOCUMENTS

| | | |
|---|---|---|
| 2015/0092756 A1 | 4/2015 | Sorrentino |
| 2015/0215979 A1* | 7/2015 | Nan .................... H04W 76/023 |
| | | 370/329 |
| 2015/0305038 A1* | 10/2015 | Du .................... H04W 72/0453 |
| | | 370/329 |
| 2016/0285935 A1* | 9/2016 | Wu .................... H04L 65/4076 |
| 2016/0295624 A1* | 10/2016 | Novlan ................... H04L 67/12 |
| 2016/0353484 A1* | 12/2016 | Wentink ................ H04W 74/08 |

OTHER PUBLICATIONS

Giuseppe Araniti, et al., "LTE for vehicular networking: a survey;" IEEE Communications Magazine; Piscataway, NJ, US, May 1, 2013.

* cited by examiner

TRANSMISSION OF PRIORITIZED MESSAGES

TECHNICAL FIELD

The disclosed subject matter relates generally to telecommunications, and more particularly to transmission of prioritized messages in telecommunications systems.

BACKGROUND

In Release 12 (Rel-12), the Long Term Evolution (LTE) standard was extended with support for device-to-device (D2D) (specified as "sidelink") features targeting both commercial and public safety applications. One application enabled by Rel-12 LTE is device discovery, where devices are able to sense the proximity of other devices and associated applications by broadcasting and detecting discovery messages that carry device and application identities. Another application is direct communication based on physical channels terminated directly between devices.

A potential extension for D2D technology is support of vehicle-to-other (V2x) communication, which includes any combination of direct communication between vehicles and other entities, such as pedestrians and infrastructure. Examples of V2x communication include vehicle-to-vehicle (V2V) communication, vehicle-to-pedestrian (V2P) communication, and vehicle-to-infrastructure (V2I) communication, to name but a few.

V2x communication may take advantage of a network (NW) infrastructure when available, but at least basic V2x connectivity should be possible even with a lack of NW coverage. Providing an LTE-based V2x interface may be economically advantageous because of LTE economies of scale. It may also enable tighter integration between communications with the NW infrastructure (V2I) and V2P and V2V communications, as compared to using a dedicated V2x technology.

V2x communication may carry both non-safety and safety information, where each of the applications and services may be associated with specific requirements sets, e.g., in terms of latency, reliability, capacity, etc.

The European Telecommunications Standards Institute (ETSI) has defined two types of messages for road safety: Co-operative Awareness Message (CAM) and Decentralized Environmental Notification Message (DENM).

A CAM message is intended to enable vehicles, including emergency vehicles, to notify their presence and other relevant parameters in a broadcast fashion. Such messages target other vehicles, pedestrians, and infrastructure, and are handled by their applications. CAM messages also provide active assistance for safe driving in normal traffic. The availability of a CAM message is indicatively checked for every 100 ms, yielding a detection latency requirement of <=100 ms for most messages. However, the maximum latency requirement for a Pre-crash sensing warning is 50 ms.

A DENM message is event-triggered, such as by braking, and the availability of a DENM message is also checked for every 100 ms. The latency requirement for a DENM message is <=100 ms.

The package size of CAM and DENM messages varies from 100+ to 800+ bytes and the typical size is around 300 bytes. Such messages are supposed to be detectable by all vehicles in proximity.

The Society of the Automotive Engineers (SAE) also defined the Basic Safety Message (BSM) for DSRC with various messages sizes defined. According to the importance and urgency of the messages, the BSMs are further classified into different priorities.

In V2x communications, the end-to-end latencies experienced when using resource allocation algorithms for common applications may not meet the tight requirements of urgent messages. In addition, resource allocation algorithms based on scheduling periods may not allow for instantaneous transmission of urgent messages.

SUMMARY

In one embodiment of the disclosed subject matter, a method is performed in a communications network comprising a plurality of communication devices using shared communication resources. The method comprises identifying, by a device among the plurality of communication devices, a time interval among the shared communication resources that can be allocated for separate use by another one of the plurality of communication devices, identifying, by the device, a guard period of the time interval, and transmitting, by the device, information within the guard period.

In certain related embodiments, the method further comprises determining that the information requires urgent transmission, and in response to the determination, transmitting the information within the guard period. In some such embodiments, the method further comprises, in further response to the determination, transmitting the information within another guard period associated with another time interval. In some such embodiments, the information constitutes part of an urgent message to be transmitted across multiple different guard periods. The multiple different guard periods may correspond to consecutive or non-consecutive time intervals among the shared communication resources.

In certain related embodiments, the time interval is identified in relation to a common timing reference accessible to the plurality of communication devices.

In certain related embodiments, the communication devices are employing D2D communication, e.g., V2x devices employing D2D communication.

In certain related embodiments, the time interval is a subframe of an LTE radio frame.

In certain related embodiments, the information comprises a CAM message, a DENM message, or a BSM message.

In certain related embodiments, the method further comprises determining a timeslot in which the device is to transmit during a scheduling period associated with the plurality of communication devices, determining that an urgent message is to be transmitted by the device within the scheduling period and before the determined timeslot, and in response to determining that the urgent message is to be transmitted by the device before the determined timeslot, transmitting the urgent message as at least part of the information transmitted within the guard period. In some such embodiments, determining the timeslot comprises analyzing prior usage of the shared communication resources to determine expected timeslot availability, and selecting the timeslot based on the expected timeslot availability.

In certain related embodiments, the time interval is allocated under control of a scheduler, and the information is transmitted within the guard period independent of the scheduler. The scheduler can be operated by an EnodeB, for example.

In certain related embodiments, the device transmits the information during a period shorter than the entire guard period, and the device avoids transmission during a remainder of the guard period.

In certain related embodiments, the method further comprises controlling the device to transmit with one power level during the guard period, and with another power level during periods other than the guard period.

In certain related embodiments, the method further comprises determining whether a subframe following the guard period is a subframe that requires timing advance, and transmitting the information within the guard period as a consequence of determining that the subframe requires timing advance.

In certain related embodiments, the method further comprises determining whether a subframe following the guard period is a subframe that requires timing advance, and selectively transmitting the information with a first or second format and first or second power within the guard period according to the determination.

In certain related embodiments, the method further comprises determining whether a subframe following the guard period is a D2D subframe, and transmitting the information within the guard period as a consequence of determining that the subframe is a D2D type subframe.

In certain related embodiments, the method further comprises determining whether a subframe following the guard period is a D2D subframe, and selectively transmitting the information with a first or second format and first or second power within the guard period according to the determination.

In certain related embodiments, the device is configured to transmit OFDM symbols with a first duration during normal operation, and the information comprises at least one OFDM symbol having a second duration that is a divisor of the first duration.

In certain related embodiments, the information comprises an urgent message, or the information is configured to inform other devices among the communication devices on how to obtain an urgent message.

In certain related embodiments, the information comprises a scheduling assignment for the device.

In certain related embodiments, the device transmits the information using a sub-portion of the shared communication resources to allow yet another device among the plurality of communication devices to transmit other information in another sub-portion of the shared communication resources during the guard period.

In another embodiment of the disclosed subject matter, a communication device is configured to operate in a communications network comprising multiple communication devices using shared communication resources on a separate basis. The communication device comprises a processor and memory configured to identify a time interval that can be scheduled for separate use by another one of the communication devices, and further configured to identify a guard period of the time interval and a transmitter configured to transmit information within the guard period. In certain related embodiments, the communication device may operate according to the foregoing method and related features.

BRIEF DESCRIPTION OF THE DRAWINGS

The drawings illustrate selected embodiments of the disclosed subject matter. In the drawings, like reference labels denote like features.

DETAILED DESCRIPTION

The following description presents various embodiments of the disclosed subject matter. These embodiments are presented as teaching examples and are not to be construed as limiting the scope of the disclosed subject matter. For example, certain details of the described embodiments may be modified, omitted, or augmented without departing from the scope of the described subject matter.

In general, the disclosed subject matter provides various methods and apparatuses that can be used to transmit prioritized messages in a telecommunications system. In certain embodiments, such messages are transmitted in a guard period (GP) of D2D communications.

The disclosed subject matter may provide various potential benefits compared to conventional technologies, such as allowing urgent messages to be transmitted with relatively low latency, and allowing user equipment (UEs) with high priority messages to transmit without a scheduling grant.

The described embodiments may be implemented in any appropriate type of communication system supporting any suitable communication standards and using any suitable components. As examples, certain embodiments may be implemented in an LTE network, such as that illustrated in FIG. 1 or FIG. 2.

Figure 1:
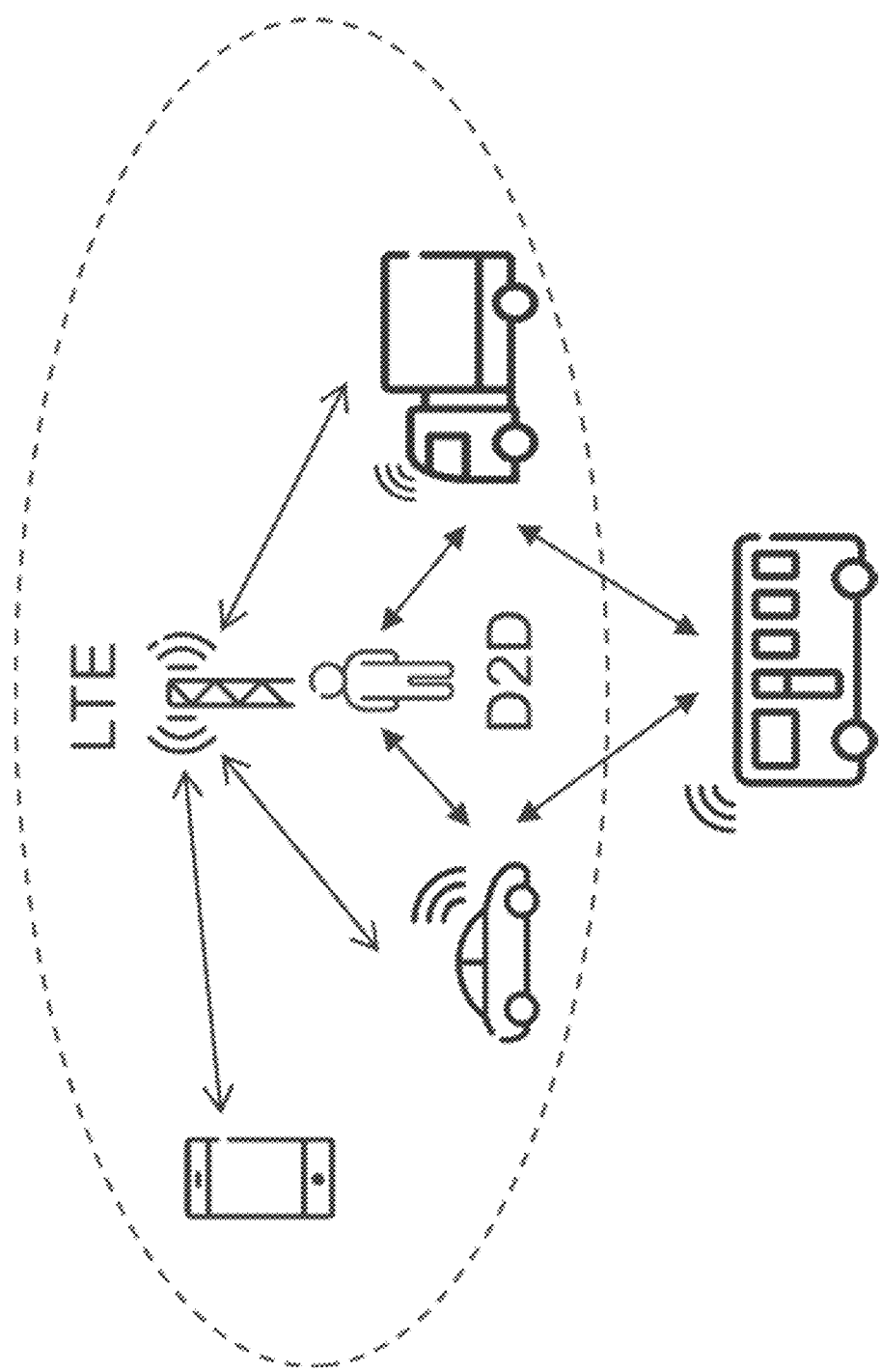
FIG. 1 is a diagram illustrating various V2x scenarios for an LTE network, according to an example embodiment.

FIG. 1 is a diagram illustrating various V2x scenarios for an LTE network, according to an example embodiment. In FIG. 1, communication may occur in an LTE network between different UEs and a network node, and between different UEs and each other. Example UEs shown in FIG. 1 include telecommunication equipment associated with a mobile phone, a car, a truck, a bus, and a pedestrian.

Figure 2:
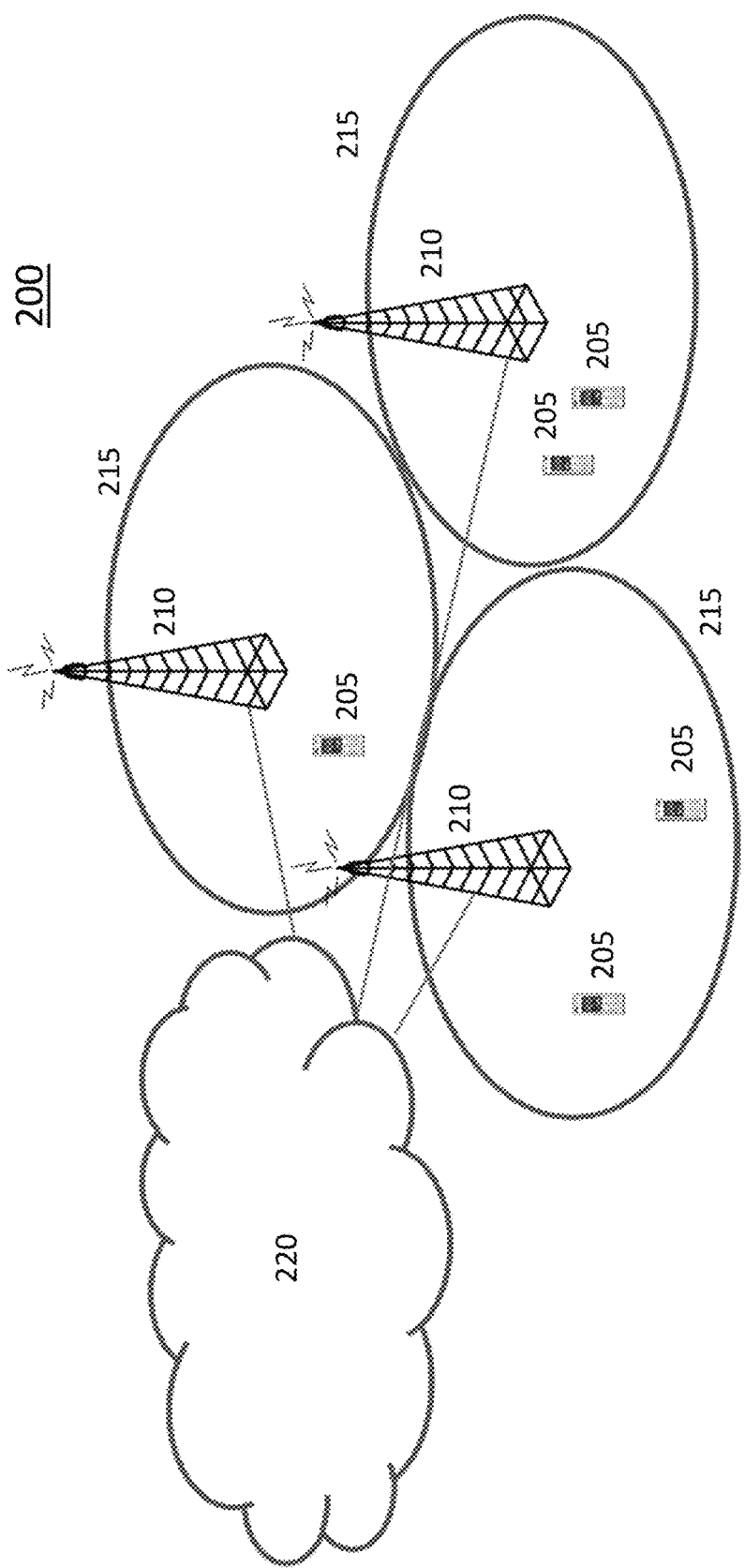
FIG. 2 is a diagram illustrating an LTE network, according to an example embodiment.

FIG. 2 is a diagram illustrating an LTE network, according to an example embodiment.

Referring to FIG. 2, a communication network 200 comprises a plurality of wireless communication devices 205 (e.g., conventional UEs, D2D/machine type communication (MTC)/machine-to-machine (M2M) UEs, vehicles, etc.) and a plurality of radio access nodes 210 (e.g., eNodeBs or other base stations). Communication network 200 is organized into cells 215, which are connected to a core network 220 via corresponding radio access nodes 210. Radio access nodes 210 are capable of communicating with wireless communication devices 205 along with any additional elements suitable to support communication between wireless communication devices or between a wireless communication device and another communication device (such as a landline telephone).

Figure 3:
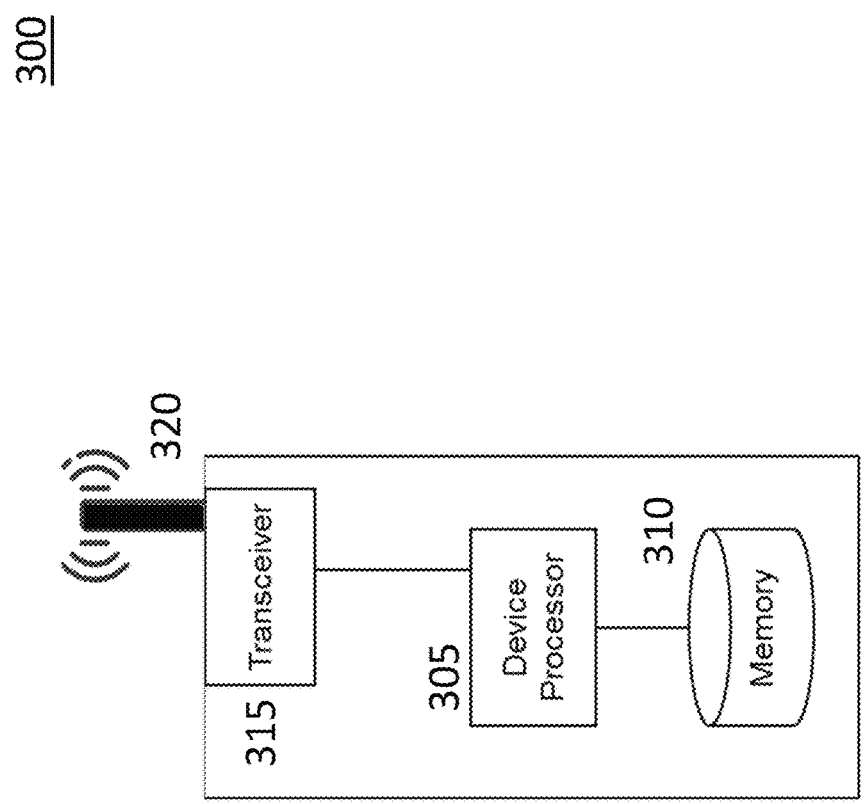
FIG. 3 is a diagram illustrating a wireless communication device, according to an example embodiment.

Although wireless communication devices 205 may represent communication devices that include any suitable combination of hardware and/or software, these wireless communication devices may, in certain embodiments, represent devices such as an example wireless communication device illustrated in greater detail by FIG. 3. Similarly, although the illustrated radio access node may represent network nodes that include any suitable combination of hardware and/or software, these nodes may, in particular embodiments, represent devices such as the example radio access node illustrated in greater detail by FIG. 4.

FIG. 3 is a diagram illustrating a wireless communication device 300, according to an example embodiment. Wireless communication device 300 could take any of various alternative forms, such as a mobile phone or telecommunication equipment associated with a vehicle, for instance.

Referring to FIG. 3, wireless communication device 300 comprises a processor 305, a memory, a transceiver 315, and an antenna 320. In certain embodiments, some or all of the functionality described as being provided by UEs, MTC or M2M devices, and/or any other types of wireless communication devices may be provided by the device processor executing instructions stored on a computer-readable medium, such as the memory shown in FIG. 3. Alternative embodiments may include additional components beyond those shown in FIG. 3 that may be responsible for providing certain aspects of the device's functionality, including any of the functionality described herein.

Figure 4:
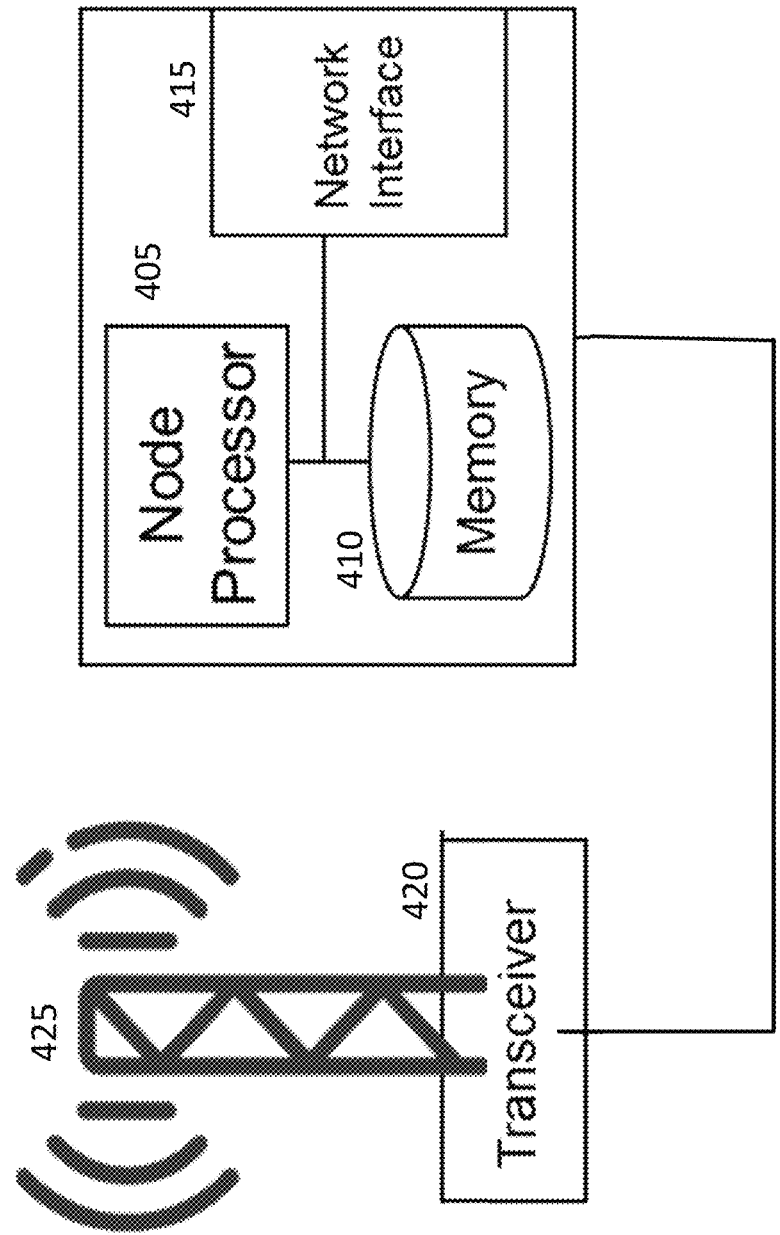
FIG. 4 is a diagram illustrating a radio access node, according to an example embodiment.

FIG. 4 is a diagram illustrating a radio access node 400, according to an example embodiment.

Referring to FIG. 4, radio access node 400 comprises a node processor 405, a memory 410, a network interface 415, a transceiver 420, and an antenna 425. In certain embodiments, some or all of the functionality described as being provided by a base station, a node B, an enodeB, and/or any other type of network node may be provided by node processor 405 executing instructions stored on a computer-readable medium, such as memory 410 shown in FIG. 4. Alternative embodiments of radio access node 400 may comprise additional components to provide additional functionality, such as the functionality described herein and/or related supporting functionality.

The disclosed subject matter may be applied to LTE or to any other type of wireless system with a time-slotted structure that includes guard periods (GP) in which transmitters remain silent. While certain embodiments are tailored for V2x applications, the described concepts can be applied to other applications as well.

D2D communication is considered an enabler for the continuous exchange of information between closely located UEs that is necessary for V2V/V2x applications. Another potential benefit of D2D-based V2V/V2x communications is that D2D technology can operate without network assistance and thus may allow for providing services to UEs that are out of cellular coverage. These decentralized D2D capabilities may of course be combined with NW-controlled features for UEs that are in-coverage. In either case (in or out of coverage), radio resources need to be allocated to different UEs to ensure a level of access to the channel that is compatible with the requirements of V2x applications.

To meet these requirements while utilizing the radio resources in an efficient manner, reasonable resource allocation algorithms strive to reduce interference and collisions between UEs and to increase the spatial reutilization of the resources. Many of these algorithms exploit available knowledge of channel usage (e.g., obtained from past channel observations) to choose transmission resources to be used by a specific UE. For example, some algorithms search for channel-utilization patterns and use them to predict the availability of radio resources in the future (e.g. STDMA). This process may be performed so that requirements on latency and frequency of transmission are met in a natural way. For example, a typical requirement for transmission of CAM messages is that they are sent at a rate of 10 messages per second. Thus, the resource allocation algorithm may divide time in scheduling periods of 100 ms each and select the preferred time slot (e.g., LTE subframe(s)) for transmission at the beginning of each scheduling period. In doing so, it may exploit past channel observations in order to maximize the chances of being received by its neighbors (e.g., avoid packet collisions, packet drops due to half-duplex constraints, etc.). Note that the resource allocation algorithm may be present at a transmitting UE, at another node (e.g. an eNB), or may be distributed across several nodes in the NW.

To reduce packet collisions, long scheduling periods are desirable. However, in general a maximum duration of a scheduling period is constrained by the latency requirements of the application. In some cases, a few messages may have much tighter latency requirements than those for the majority of messages. For example, in V2x safety applications, a UE may need to broadcast information about a sudden brake or a hazardous condition. Such transmissions typically have latency requirements that are more stringent than those of other broadcasted messages (e.g, CAM updates). Moreover, even if the stricter latency requirements can be met, it may be of interest of all users that urgent messages are delivered as soon as possible, for their reception may help to prevent accidents on the road.

Figure 5:
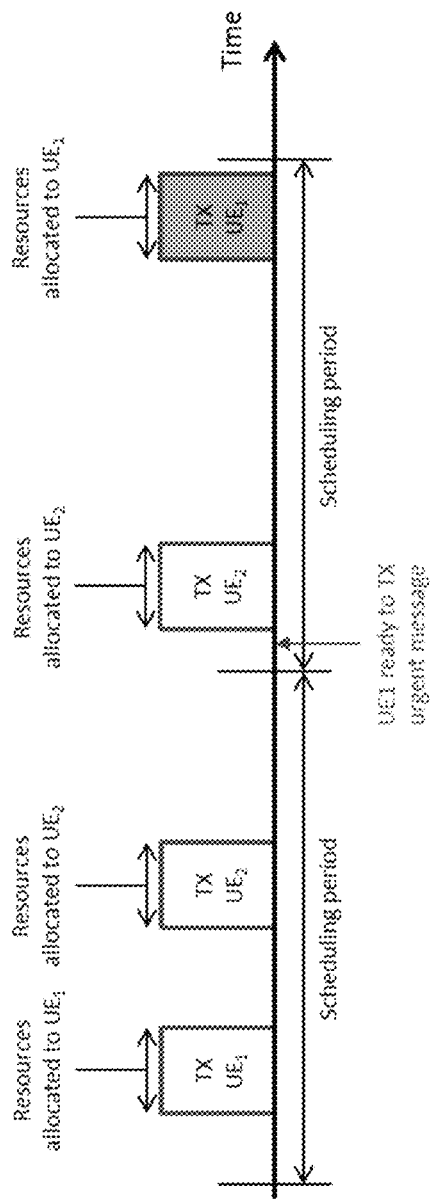
FIG. 5 is a diagram illustrating a delay between the arrival of an urgent packet and allocated resources, according to an example embodiment.

With many existing resource allocation algorithms, earlier transmission of urgent messages is not possible if such messages arrive after a resource allocation decision has been made for a current scheduling period. Accordingly, a UE with an urgent message may need to wait for its turn to access the channel within the current scheduling period, even if the urgent message is ready for transmission much earlier. This situation is illustrated in FIG. 5. Even worse, the UE with the urgent message may need to wait until a next resource allocation period if it has already used the channel resources for the current scheduling period. The disclosed embodiments, however, provide a mechanism to transmit urgent messages without having to wait for the allocated resources.

FIG. 5 is a diagram illustrating a delay between the arrival of an urgent packet and allocated resources, according to an example embodiment. As illustrated in FIG. 5, a UE1 is ready to transmit an urgent message at the beginning of a scheduling period, but it is not allocated resources until the end of the scheduling period.

As described above, D2D communication features are an enabler for V2V/V2x communication. Thus, the following examples relate to V2V/V2x communication using the subframe structure for LTE D2D communication introduced in Rel-12. This subframe comprises several orthogonal frequency division multiplexing (OFDM) symbols followed by a guard period (GP) in which the transmitter remains silent. The length of this GP equals that of the last OFDM symbol in a normal (non-D2D) LTE subframe, as illustrated in FIG. 6.

Figure 6:
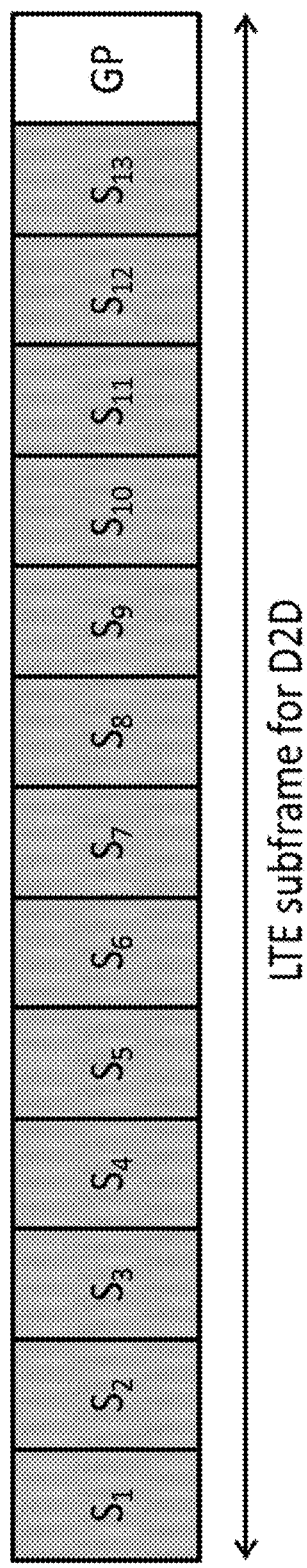
FIG. 6 is a diagram illustrating an LTE subframe for D2D communication with a normal cyclic prefix, according to an example embodiment.

FIG. 6 is a diagram illustrating an LTE subframe for D2D communication with a normal cyclic prefix, according to an example embodiment. In the LTE subframe of FIG. 6, the first 13 symbols are used for D2D transmission and a last one is the guard period (GP) and remains unused, as specified in 3GPP Rel-12.

The purpose of the GP is to protect other nodes in the network from interference generated by D2D transmitters. For example, the GP mechanism reduces interference created by D2D transmitters to a nearby eNB due to timing misalignments. The use of the GP may be particularly useful because D2D transmitters may use a timing reference that is not compatible with that used by cellular UEs for uplink transmission to the eNB (i.e., uplink timing). In D2D subframes followed by uplink cellular transmission, the GP ensures a protection against all timing misalignments that are below the duration of the GP. For example, usually a largest timing misalignment Tmax that can be handled in this way for LTE-D2D Rel-12 is Tmax=71.4 µs (i.e., the duration of the last OFDM symbol when using 15 kHz subcarrier spacing and normal cyclic prefix).

In V2x transmission, it may not be necessary to include a GP with a length of one symbol in all subframes for several reasons. First, it is expected that within an LTE carrier, large numbers of radio resources are designated for V2x applications (in contrast, it is expected that only a small fraction of subframes are designated for LTE-D2D Rel-12 use). Thus, if the radio resources are shared between V2x and other applications (e.g., cellular), V2x resources may be grouped in time. Consequently, most V2x subframes will be followed by another V2x subframe rather than a subframe designated for another application. Second, it is expected that most V2x nodes have access to a high-precision time reference such as UTC (e.g., through GPS signals), which may alleviate the problems of synchronization. In addition, the communication range for V2x (and in particular V2V) is much smaller (e.g., few hundred meters) than the typical dimensions of a cell (up to several tens of kilometers). As a result, in many subframes it may suffice to include a protection against timing misalignments only to and from V2x users (as opposed to a protection to cellular nodes from V2x users).

If it is assumed that the only source of timing misalignments is the propagation time between TX and RX, the current configurations provide protection for V2V UEs that are separated up to $$d_{max} = \frac{c \cdot T_{max}}{2} \approx 10.7 \text{ km}$$

(c is the speed of light). At the other extreme, if the GP is totally suppressed, the CP still provides some protection against timing misalignments. This corresponds to a maximum TX-RX distance of $$d = \frac{c \cdot T_{CP}}{2} \approx 350 \text{ m}$$

where $T_{CP}$=4.7 µs is the duration of the typical CP). For typical ranges of V2x communications, this distance may be sufficient. That is, for most of the V2x subframes a much shorter GP (or even no GP at all), may be sufficient.

Nevertheless, a one-symbol long GP is already included in the LTE D2D specifications for Rel-12. Thus, UEs may take advantage of its presence and use the GP resources to transmit urgent messages. That is, a UE with a message categorized as urgent may start transmitting in the GPs of resources allocated to other users instead of waiting until its pre-allocated resources.

Figure 7:
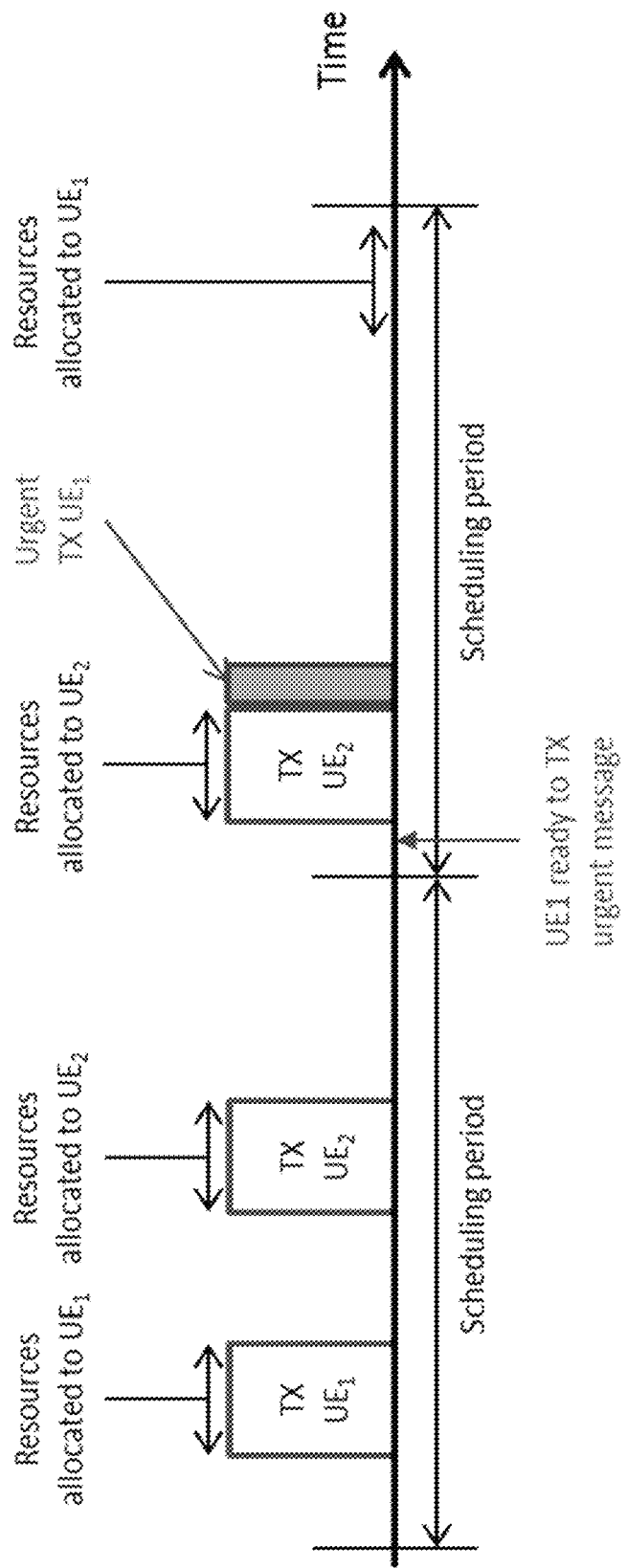
FIG. 7 is a diagram illustrating transmission of an urgent message ahead of a scheduled transmission time, according to an example embodiment.

FIG. 7 is a diagram illustrating transmission of an urgent message ahead of a scheduled transmission time, according to an example embodiment.

Referring to FIG. 7, a first UE ($UE_1$) is ready to transmit an urgent message at the beginning of a scheduling period, but its allocated resources are toward the end of the scheduling period. Rather than waiting to transmit the urgent message, as in FIG. 5, the first UE instead transmits the urgent message in a GP associated with a second UE ($UE_2$).

In this example, the first UE gets the opportunity to transmit its message ahead of its scheduled transmission time without interfering with the second UE. In the illustrated example, the first UE does not use the resources that had initially been allocated to it, although in practice it could use those resources as well.

The signal transmitted during the GP may employ the whole duration of the GP or may be shortened at the beginning or at the end in order to protect other UEs against interference due to time misalignments. Such protection may also be provided by adapting the power level accordingly. In V2x subframes that precede subframes designated for other applications, urgent V2x messages may use a special format that reduces interference created at other (non-V2x) receivers or they may be forbidden altogether. The latter case is illustrated in FIG. 8.

Figure 8:
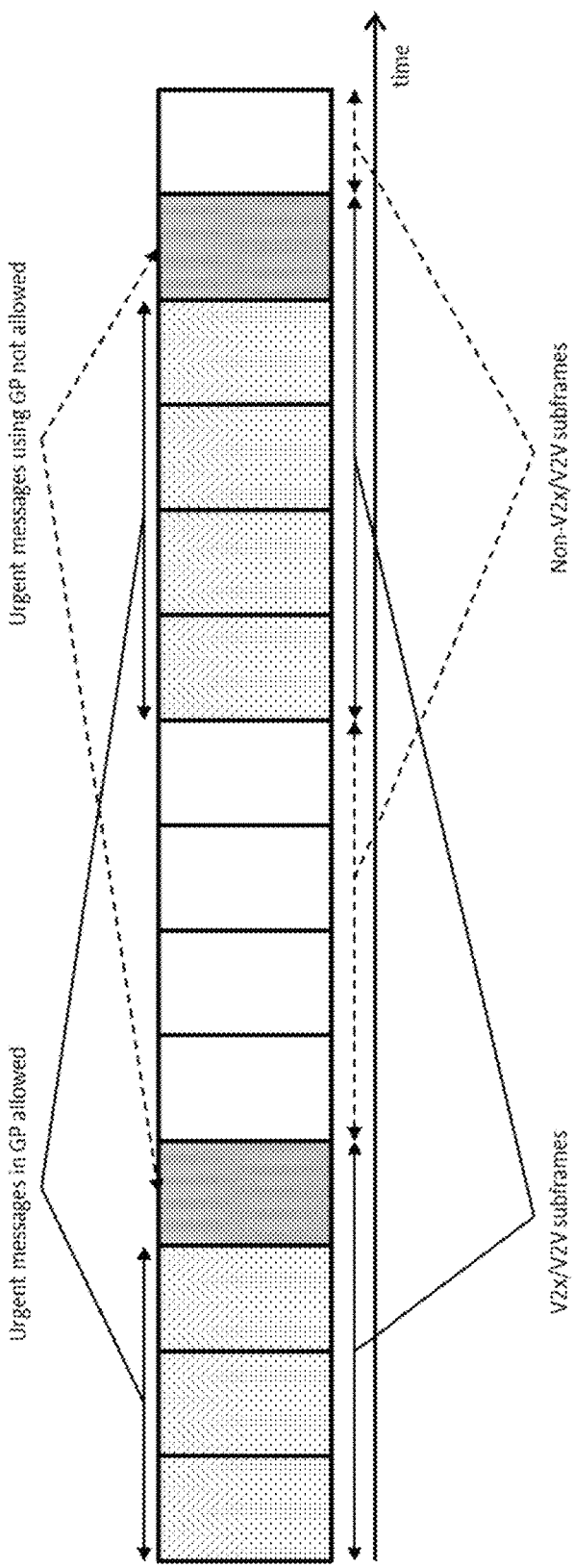

FIG. 8 is a diagram illustrating different types of subframes, according to an example embodiment. In FIG. 8, shaded subframes (both light and dark) are designated for V2x/V2V used. Non-shaded subframes are designated for other purposes (e.g., cellular communication). Transmission of urgent messages using the GP is allowed on all V2X/V2V subframes except those immediately before a subframe designated for other purposes.

In addition to the aforementioned possible shortenings at the beginning and/or the end of urgent transmission during the GP, the transmitted signal may include one or more sections containing data (e.g., shortened OFDM symbols) and one or more sections containing the reference signals necessary for channel estimation, demodulation, etc. Each of the data sections may also include a cyclic prefix (CP), which may be shorter than the CP used in the other symbols of the subframe. The different sections may be multiplexed in frequency, as in the example illustrated in FIG. 9, or in time, as in the example illustrated in FIG. 10.

Figure 9:
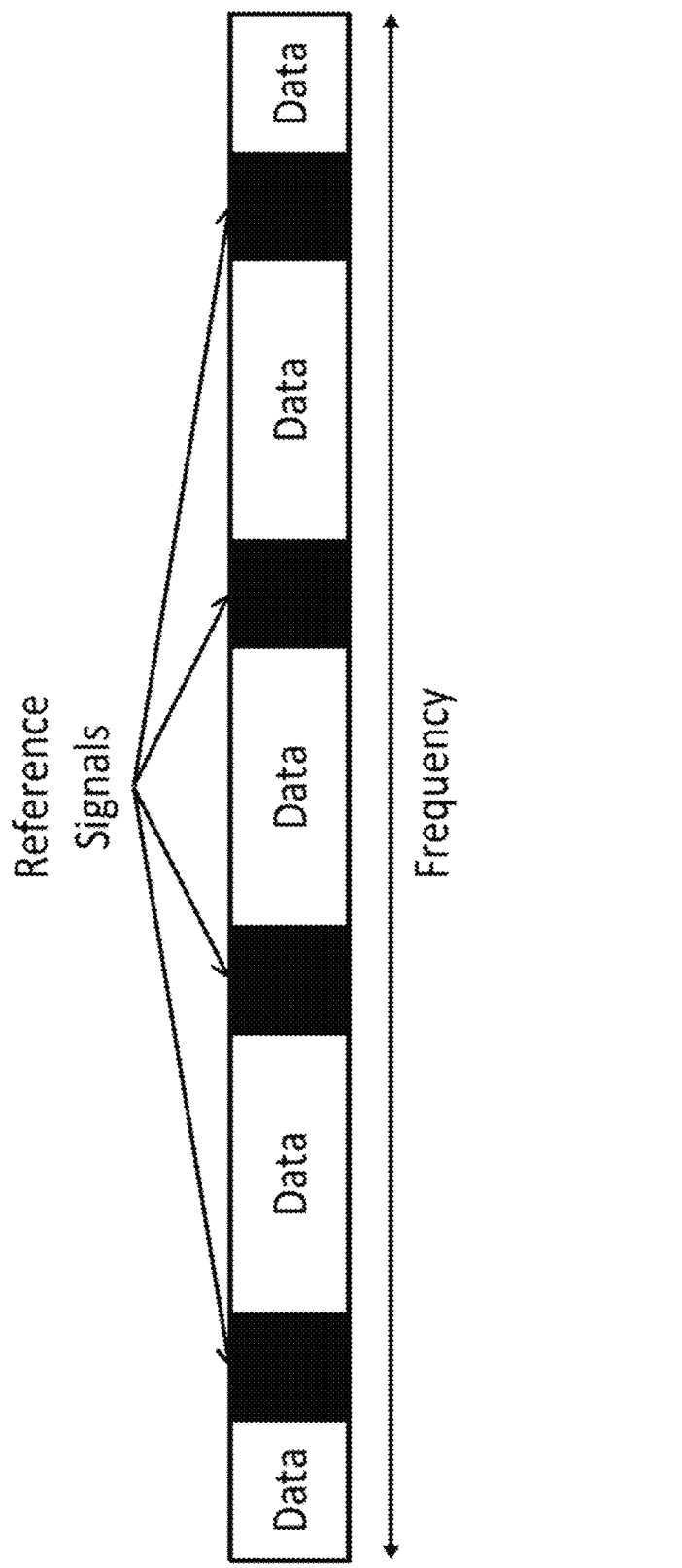
FIG. 9 is a diagram illustrating multiplexing of data and reference signals in frequency, according to an example embodiment.

FIG. 9 is a diagram illustrating multiplexing of data and reference signals (RS) in frequency, according to an example embodiment. In FIG. 9, the data resources may contain a cyclic prefix, which is not explicitly shown in FIG. 9.

Figure 10:
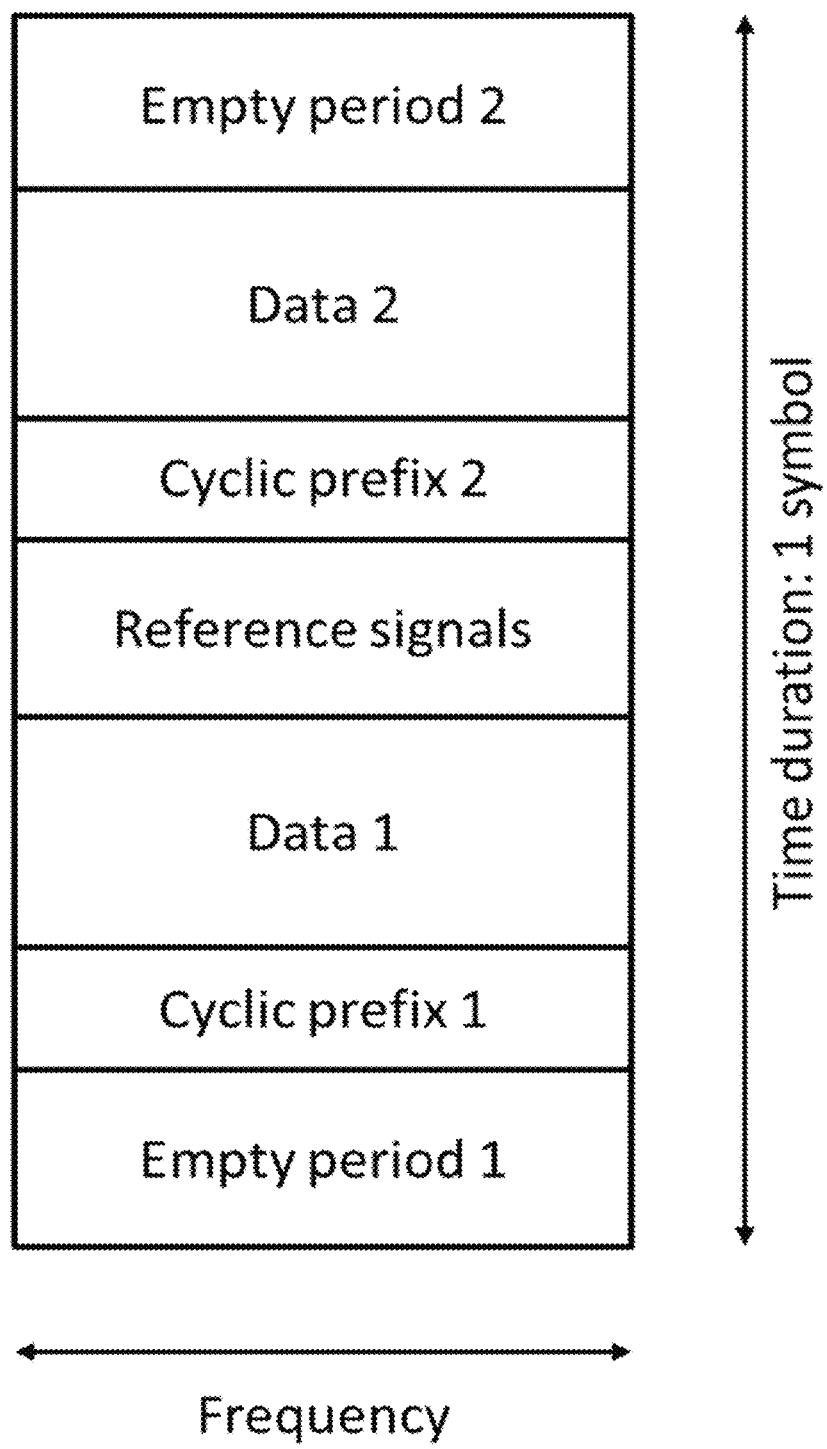
FIG. 10 is a diagram illustrating example of multiplexing of data and reference signals in time, according to an example embodiment.

FIG. 10 is a diagram illustrating example of multiplexing of data and reference signals in time, according to an example embodiment. In FIG. 10, silent periods are included before and after the actual data transmission. In addition, a cyclic prefix is included for each of the data sections.

Multiplexing data and RS in time rather than in frequency has the potential benefit of preserving the good peak-to-average power ratio (PAPR) properties (by using the legacy SC-OFDM for the transmission of data and specifically designed sequences for RS). If several data sections are present, they may contain different information or they may be repeated. The duration of the emergency symbol may be distributed unevenly among the different sections.

To reduce the implementation complexity, it may be beneficial to use OFDM symbols for the data section shortened to a duration that is a divisor of the length of the normal OFDM symbols (i.e., the symbols used in the rest of the subframe: e.g., S1 to S13 in FIG. 6). In such case, it is possible to take advantage of the properties of the inverse fast Fourier transformation (IFFT) to generate the shortened symbol using the same IFFT module used for the normal OFDM symbols.

The urgent transmission may be restricted to a single GP (i.e., belonging to a single symbol) or may employ several of them (i.e., belonging to several LTE subframes, consecutive or not). In this way, a larger payload may be transmitted or a higher reliability may be achieved. For example, potential RXs that may be affected by half-duplex or near-far effects in the GP corresponding to one subframe may not be so in later ones, and they will therefore be able to receive the retransmitted urgent message. Similarly, the transmission may span the whole band allocated for V2x/V2V or only part of it.

Mechanisms for contention-based channel access may be included to allow several users to transmit urgent messages concurrently. For example, several combinations of GP resources (i.e. associated subframe, frequency subband, etc.) may be defined to ensure that more than one UE can transmit an urgent packet at a time. As another example, a basic set of orthogonal messages may be defined. The choice of the resources or messages may follow a UE-specific rule to reduce the chance that two or more UEs with urgent messages collide. In addition, the method described here may also include the possibility of defining several categories of priority among urgent messages and allocate GP resources unevenly to each of them.

The payload transmitted by the UE may contain the urgent message itself or some information for the receiving UEs on how to obtain the urgent message. For example, the UE with the urgent message may broadcast a scheduling assignment for itself for some resources in the near future (i.e., possibly much earlier than those that would have been granted by a resource allocation algorithm operating under normal circumstances). In this way, other UEs may defer their transmissions in those resources and remain silent to facilitate broadcast of the urgent message. If the communication needs for the UE with the urgent message are satisfied with the urgent transmission, it may decide not to transmit in the resources originally allocated to it, as illustrated in FIG. 7.

Figure 11:
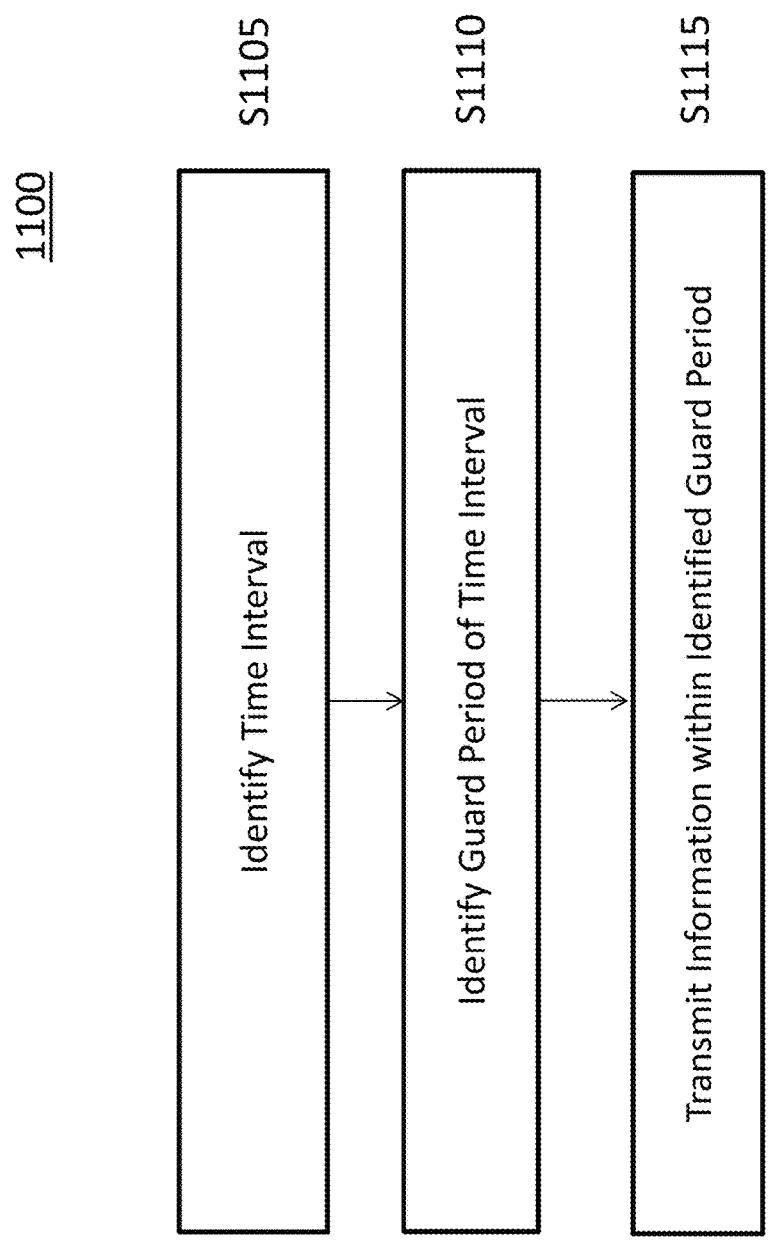
FIG. 11 is a flowchart illustrating a method in a communications network comprising a plurality of communication devices using shared communication resources, according to an example embodiment.

FIG. 11 is a flowchart illustrating a method 1100 in a communications network comprising a plurality of communication devices using shared communication resources, according to an example embodiment. The method of FIG. 11 could be implemented in a scenario such as that illustrated in FIG. 1, although it is not limited to any specific network implementation. For example, the plurality of communication devices could be V2x devices or some other type of devices employing D2D communication. In general, method 1100 can be used to transmit information within a guard period, as illustrated in FIG. 7, for instance.

Referring to FIG. 11, the method comprises identifying, by a device among the plurality of communication devices, a time interval among the shared communication resources that can be allocated for separate use by another one of the plurality of communication devices (S1105), and then identifying, by the device, a guard period of the time interval (S1110). In other words, the device identifies a time interval that has not been allocated for that device, and it also identifies the guard period associated with that time interval. The method further comprises transmitting, by the device, information within the guard period (S1115).

The method may further comprise determining that the information requires urgent transmission, and in response to the determination, transmitting the information within the guard period. In other words, the method could be used to selectively transmit information in a regular allocated interval as in FIG. 5, or in a guard period as in FIG. 7. The method may further comprise, in further response to the determination, transmitting the information within another guard period associated with another time interval. In other words, the information is not necessarily limited to being transmitted in a single guard period. For example, the information could be transmitted piecemeal in different guard periods, or redundant copies of some or all of the information could be transmitted in different guard periods. The information may constitute part of an urgent message to be transmitted across multiple different guard periods. The multiple different guard periods may correspond to consecutive or non-consecutive time intervals among the shared communication resources.

The method of FIG. 11 may include any of the following features in various alternative embodiments. The time interval may be identified in relation to a common timing reference accessible to the plurality of communication devices. The communication devices may employ D2D communication, e.g., V2x devices employing D2D communication. The time interval may be a subframe of an LTE radio frame. The information may comprise a CAM message, a DENM message, or a BSM message.

The method of FIG. 11 may be performed in conjunction with network scheduling operations. For example, the method may further comprise determining a timeslot in which the device is to transmit during a scheduling period associated with the plurality of communication devices, determining that an urgent message is to be transmitted by the device within the scheduling period and before the determined timeslot, and in response to determining that the urgent message is to be transmitted by the device before the determined timeslot, transmitting the urgent message as at least part of the information transmitted within the guard period. In some such embodiments, determining the timeslot comprises analyzing prior usage of the shared communication resources to determine expected timeslot availability, and selecting the timeslot based on the expected timeslot availability.

In some embodiments, the time interval is allocated under control of a scheduler, and the information is transmitted within the guard period independent of the scheduler. The scheduler can be operated by an EnodeB, for example.

In some embodiments, the device transmits the information during a period shorter than the entire guard period, and avoids transmission during a remainder of the guard period.

In some embodiments, the method further comprises controlling the device to transmit with one power level during the guard period, and with another power level during periods other than the guard period.

In some embodiments, the method further comprises determining whether a subframe following the guard period is a subframe that requires timing advance, and transmitting the information within the guard period as a consequence of determining that the subframe requires timing advance.

In some embodiments, the method further comprises determining whether a subframe following the guard period is a subframe that requires timing advance, and selectively transmitting the information with a first or second format and first or second power within the guard period according to the determination.

In some embodiments, the method further comprises determining whether a subframe following the guard period is a D2D subframe, and transmitting the information within the guard period as a consequence of determining that the subframe is a D2D type subframe.

In some embodiments, the method further comprises determining whether a subframe following the guard period is a D2D subframe, and selectively transmitting the information with a first or second format and first or second power within the guard period according to the determination.

In some embodiments, the device is configured to transmit OFDM symbols with a first duration during normal operation, and information comprises at least one OFDM symbol having a second duration that is a divisor of the first duration.

In some embodiments, the information comprises an urgent message, or the information is configured to inform other devices among the communication devices on how to obtain an urgent message.

In some embodiments, the information comprises a scheduling assignment for the device.

In some embodiments, the device transmits the information using a sub-portion of the shared communication resources to allow yet another device among the plurality of communication devices to transmit other information in another sub-portion of the shared communication resources during the guard period.

Figure 12:
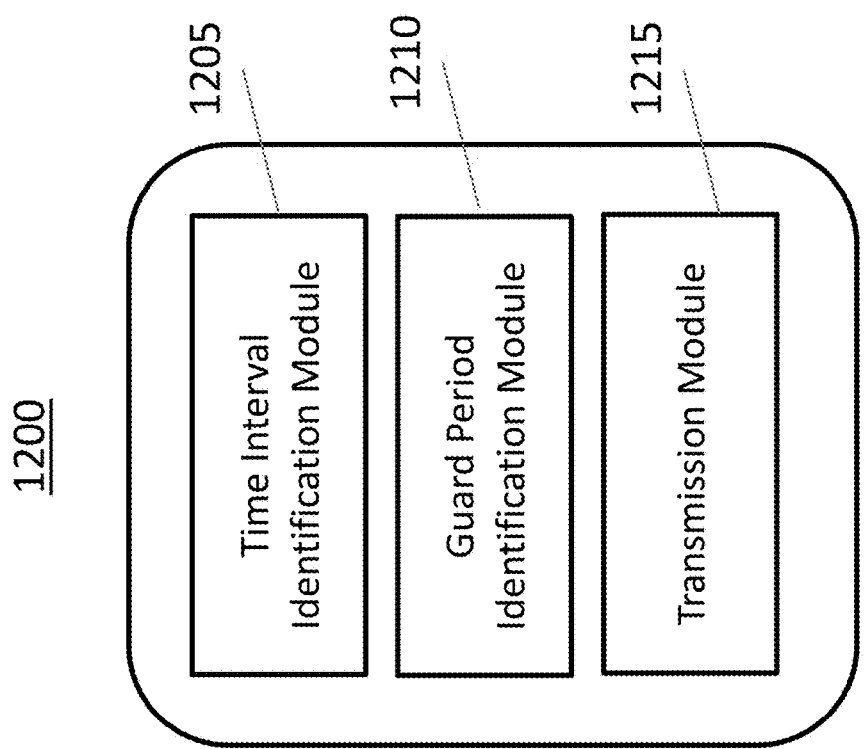
FIG. 12 is a diagram illustrating a communication device configured to operate in a communications network comprising multiple communication devices using shared communication resources on a separate basis, according to an example embodiment.

FIG. 12 is a diagram illustrating a communication device 1200 configured to operate in a communications network comprising multiple communication devices using shared communication resources on a separate basis, according to an example embodiment. Communication device 1200 may be, for instance, one of several communication devices employing D2D communication with shared communication resources. In general, communication device 1200 comprises modules configured to perform operations such as those described in relation to FIG. 11. Such modules may comprise any suitable combination of hardware and/or software capable of performing the designated functions. For example, they may comprise one or more processors or controllers, in combination with suitable memory components, software, etc.

Referring to FIG. 12, communication device 1200 comprises a time interval identification module 1205 configured to identify a time interval that can be scheduled for separate use by another one of the communication devices, a guard period identification module 1210 configured to identify a guard period of the time interval, and a transmission module 1215 (e.g., a transmitter) configured to transmit information within the guard period. In general, communication device 1200 may operate according to method 1100 and other features described in relation to FIG. 11. Moreover, communication device 1200 may include additional modules, processors, controllers, etc., to implement such other features, as will be apparent to those skilled in the art.

While the disclosed subject matter has been presented above with reference to various embodiments, it will be understood that various changes in form and details may be made to the described embodiments without departing from the overall scope of the invention.

The invention claimed is:

1. A method in a communications network comprising a plurality of communication devices using shared communication resources, comprising:
   identifying, by a first device among the plurality of communication devices, a time interval among the shared communication resources that is allocated to a second device among the plurality of communication devices;
   identifying, by the first device, a guard period of the time interval; and
   transmitting, by the first device, information within the guard period;
   wherein the plurality of communication devices are user equipment devices.

2. The method of claim 1, further comprising determining that the information requires urgent transmission, and in response to the determination, transmitting the information within the guard period.

3. The method of claim 2, further comprising, in further response to the determination, transmitting the information within another guard period associated with another time interval.

4. The method of claim 2, wherein the information constitutes part of an urgent message to be transmitted across multiple different guard periods.

5. The method of claim 4, wherein the multiple different guard periods correspond to non-consecutive time intervals among the shared communication resources.

6. The method of claim 1, wherein the time interval is identified in relation to a common timing reference accessible to the plurality of communication devices.

7. The method of claim 1, wherein the plurality of communication devices are employing device-to-device (D2D) communication.

8. The method of claim 1, wherein the plurality of communication devices are vehicle-to-other (V2x) devices employing device-to-device (D2D) communication.

9. The method of claim 1, wherein the time interval is a subframe of a Long Term Evolution (LTE) radio frame.

10. The method of claim 1, wherein the information comprises a Cooperative Awareness Message (CAM), a Decentralized Environmental Notification Message (DENM), or a Basic Safety Message (BSM).

11. The method of claim 1, further comprising:
    determining a timeslot in which the first device is to transmit during a scheduling period associated with the plurality of communication devices;
    determining that an urgent message is to be transmitted by the device within the scheduling period and before the determined timeslot; and
    in response to determining that the urgent message is to be transmitted by the first device before the determined timeslot, transmitting the urgent message as at least part of the information transmitted within the guard period.

12. The method of claim 11, wherein determining the timeslot comprises analyzing prior usage of the shared communication resources to determine expected timeslot availability, and selecting the timeslot based on the expected timeslot availability.

13. The method of claim 1, wherein the time interval is allocated under control of a scheduler, and the information is transmitted within the guard period independent of the scheduler.

14. The method of claim 13, wherein the scheduler is operated by an EnodeB.

15. The method of claim 1, wherein the first device transmits the information during a period shorter than the entire guard period, and the first device avoids transmission during a remainder of the guard period.

16. The method of claim 1, further comprising controlling the first device to transmit with one power level during the guard period, and with another power level during periods other than the guard period.

17. The method of claim 1, further comprising determining whether a subframe following the guard period is a subframe that requires timing advance, and transmitting the information within the guard period as a consequence of determining that the subframe requires timing advance.

18. The method of claim 1, further comprising determining whether a subframe following the guard period is a subframe that requires timing advance, and selectively transmitting the information with a first or second format and first or second power within the guard period according to the determination.

19. The method of claim 1, further comprising determining whether a subframe following the guard period is a device-to-device (D2D) subframe, and transmitting the information within the guard period as a consequence of determining that the subframe is a D2D type subframe.

20. The method of claim 1, further comprising determining whether a subframe following the guard period is a device-to-device (D2D) subframe, and selectively transmitting the information with a first or second format and first or second power within the guard period according to the determination.

21. The method of claim 1, wherein the first device is configured to transmit OFDM symbols with a first duration during normal operation, and the information comprises at least one OFDM symbol having a second duration that is a divisor of the first duration.

22. The method of claim 1, wherein the information comprises an urgent message.

23. The method of claim 1, wherein the information is configured to inform other devices among the communication devices on how to obtain an urgent message.

24. The method of claim 1, wherein the information comprises a scheduling assignment for the first device.

25. The method of claim 1, wherein the first device transmits the information using a sub-portion of the shared communication resources to allow a third device among the plurality of communication devices to transmit other information in another sub-portion of the shared communication resources during the guard period.

26. A communication device configured to operate in a communications network comprising multiple communication devices using shared communication resources on a separate basis, wherein the communication device is a first communication device among the multiple communication devices, comprising:
 a processor and memory configured to identify a time interval allocated to a second communication device among the multiple communication devices, and further configured to identify a guard period of the time interval; and
 a transmitter configured to transmit information within the guard period;
 wherein the multiple communication devices are user equipment devices.

27. The communication device of claim 26, wherein the processor determines that the information requires urgent transmission, and in response to the determination, the transmitter transmits the information within the guard period.

28. The communication device of claim 27, wherein the transmitter, in further response to the determination, transmits the information within another guard period associated with another time interval.

29. The communication device of claim 27, wherein the information constitutes part of an urgent message to be transmitted across multiple different guard periods.

30. The communication device of claim 29, wherein the multiple different guard periods correspond to non-consecutive time intervals among the shared communication resources.

31. The communication device of claim 26, wherein the time interval is identified in relation to a common timing reference accessible to the multiple communication devices.

32. The communication device of claim 26, wherein the multiple communication devices are employing device-to-device (D2D) communication.

33. The communication device of claim 26, wherein the multiple communication devices are vehicle-to-other (V2x) devices employing device-to-device (D2D) communication.

34. The communication device of claim 26, wherein the time interval is a subframe of a Long Term Evolution (LTE) radio frame.

35. The communication device of claim 26, wherein the processor determines a timeslot in which the device is to transmit during a scheduling period associated with the multiple communication devices, determines that an urgent message is to be transmitted by the device within the scheduling period and before the determined timeslot, and in response to the determination that the urgent message is to be transmitted by the device before the determined timeslot, the transmitter transmits the urgent message as at least part of the information transmitted within the guard period.

36. The communication device of claim 35, wherein determining the timeslot comprises analyzing prior usage of the shared communication resources to determine expected timeslot availability, and selecting the timeslot based on the expected timeslot availability.

37. The communication device of claim 26, wherein the time interval is allocated under control of a scheduler, and the information is transmitted within the guard period independent of the scheduler.

38. The communication device of claim 26, wherein the transmitter transmits the information during a period shorter than the entire guard period, and avoids transmission during a remainder of the guard period.

39. The communication device of claim 26, wherein the processor controls the device to transmit with one power level during the guard period, and with another power level during periods other than the guard period.

40. The communication device of claim 26, wherein the processor determines whether a subframe following the guard period is a device-to-device (D2D) subframe, and the transmitter transmits the information within the guard period as a consequence of determining that the subframe is a D2D type subframe.

* * * * *